April 10, 1956     T. J. PUTNAM     2,741,224
DEVICE FOR TRAINING ANIMALS
Filed Dec. 29, 1953
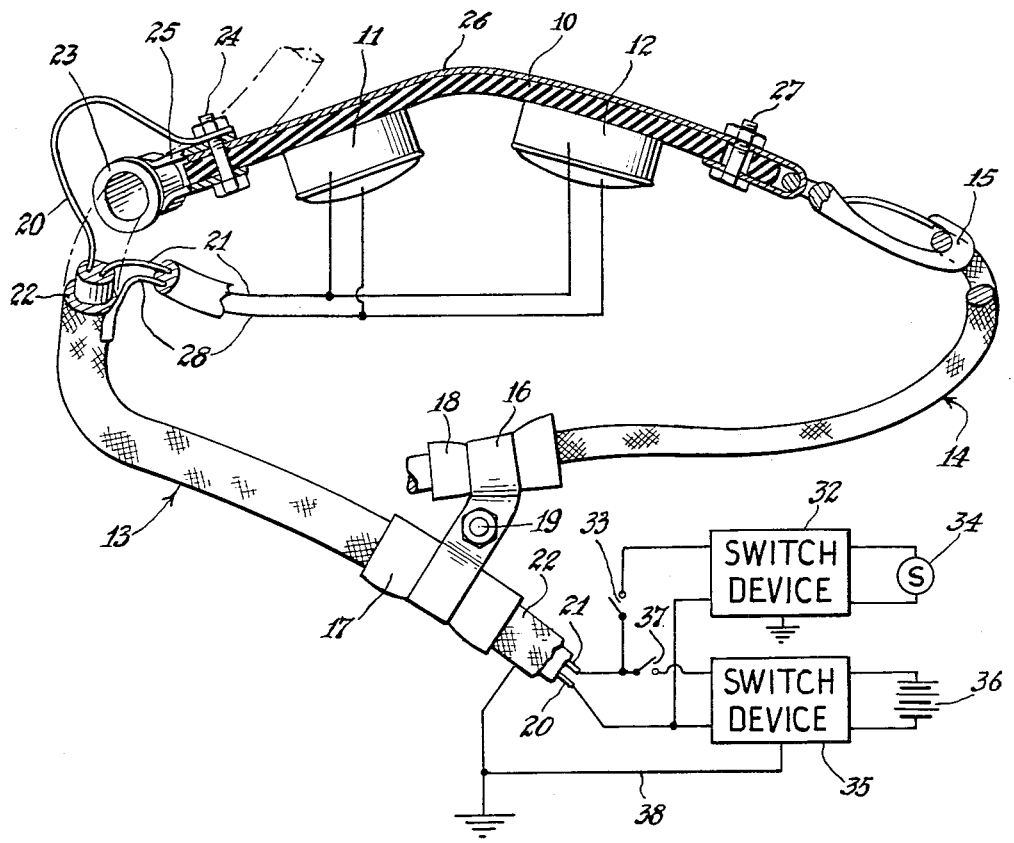
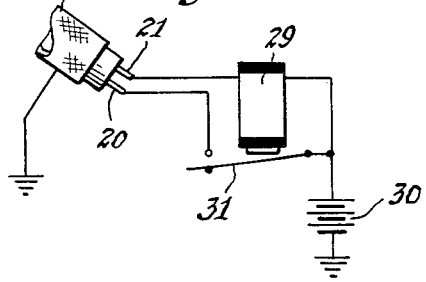
INVENTOR.
TRACY J. PUTNAM
BY *Kenyon & Kenyon*
ATTORNEYS.

2,741,224

DEVICE FOR TRAINING ANIMALS

Tracy J. Putnam, Beverly Hills, Calif.

Application December 29, 1953, Serial No. 401,009

3 Claims. (Cl. 119—29)

This invention relates to a device for training animals and is chiefly directed to training dogs not to bark or whine.

In training animals, such as dogs, it is well known that the effectiveness of punishment does not depend on severity, but on the promptness and regularity of its imposition. For this reason efforts to train dogs not to bark by scolding and whipping are often ineffective even when the punishment is severe.

According to the present invention a mildly disagreeable sensation is transmitted to the animal's body automatically each time he emits a bark or whining sound. If desired, the severity of the sensation may be proportioned to the loudness of the noise. Essentially this is achieved by microphonic closing of a switching device, the microphone being actuated by sound emitted by the animal, which transmits electric current of low amperage across a pair of metallic elements in contact with its body.

Among the advantages of the invention are the promptness with which the training is accomplished, the simplicity of the apparatus involved, and the convenience of application whether the animal is running free or is tethered.

For illustration the invention is disclosed in the form of a device for training dogs.

In the drawings forming part hereof—

Fig. 1 shows, partly in perspective and partly in section and with certain parts cut away for clarity, a dog collar made in accordance with this invention, with a diagrammatic showing of two alternative actuating circuit arrangements; and Fig. 2 shows diagrammatically a third alternative circuit actuating arrangement.

According to a preferred form of the invention a dog collar comprises a band 10 of rubber on one side of which are mounted one or more throat microphones 11, 12. To one end of band 10 there is connected a metal-sheathed cable 13, and to the other end thereof is connected a second metal-sheathed cable 14. Preferably cable 14 is detachably secured to band 10 by a suitable metallic clip 15. The opposite ends of cables 13 and 14 are secured together by fastener 16 which is so arranged that the metallic sheaths of cables 13 and 14 are insulated from each other. This may be accomplished, for example, by wrapping each cable in a band of insulating material 17, 18 around which the fastener 16, which is preferably metallic, is engaged. Thus fastener 16, which may be secured by screw 19, keeps cables 13 and 14 properly spaced and out of electrical contact with each other.

Cable 13 preferably consists of two insulated conductors 20 and 21 and a surrounding woven metallic sheath 22. Cable 13 is mechanically secured to band 10 by an insulating connection. For example, cable 13 may be passed through eye 23 of insulating material, which may be tightly engaged about metallic sheath 22 and secured in any desired manner to the end of band 10, as for example by screw 24 and loop 25.

Adjacent eye 23 electrical connections are provided between insulated conductors 20, 21, the external metallic sheath 22, throat microphones 11, 12, and the other metal-sheathed cable 14. While such electrical connections may take several forms, preferably insulated conductor 20 is connected by means of screw 24 with a metallic strap 26 secured to band 10 on the side thereof opposite to that to which the throat microphones are attached. Strap 26 is electrically connected through screw 27 with clip 15 and thus with metal-sheathed cable 14. Cable 14 may be metal-sheathed, or it may be simply a piece of wire or a chain, its purpose being to constitute an electrode in contact with the body of the dog capable of being energized through clip 15, strap 26 and insulated conductor 20. Cables 13 and 14 are herein referred to as flexible metallic strands.

The other insulated conductor 21 is connected in any suitable manner to one terminal of the throat microphones 11, 12. The other terminal of the microphones is grounded through a suitable conductor 28 to metallic sheath 22. Or, if desired, it may be independently connected through another insulated conductor (not shown) to the circuit hereinafter described.

The electric circuits associated with the above-described dog collar may take any one of several forms as desired.

If the above-described collar is to be used for training a tethered dog, the cable 13 as shown in Fig. 1 may be extended to a length of several feet and adapted to be suitably anchored or fastened to some fixed support (not shown) where connections are made from conductors 20 and 21 to the switching device hereinafter mentioned, and from metal sheath 22 to ground. In its simplest form, as indicated diagrammatically in Fig. 2, the switching device comprises a sensitive relay 29 connected to a battery 30. When microphones 11, 12 become conductive, current flows from battery 30 through relay 29 closing switch 31 thereof, thus causing current from battery 30 to flow through conductor 20 to the stimulus applying electrode such as cable 14. For greater convenience and efficiency of operation, the switching device may be as diagrammatically indicated in Fig. 1 at 32, controlled by a manual switch 33 and powered from a source of alternating current 34, such as house current. Preferably switching device 32 may be a simple amplifier of from one- to two-watts capacity, in which case the voltage applied to electrode 14 may be proportioned to the current flowing through microphones 11, 12, and the severity of stimulus administered to the dog will be in proportion to the loudness of his bark or whine.

If the above-described dog collar is to be used for training an untethered dog, the cable 13 may be attached to a small pack strapped on the back of the dog, containing a suitable switching device or amplifier 35 and a small portable battery 36 controlled by manual switch 37. In this case the ground connection of the switching device may be interconnected with metallic sheath 22 through conductor 38 which serves as ground-return lead for the system.

The electric stimulus to be applied to the dog's body is preferably an alternating or interrupted current of relatively high voltage, for example 300 to 500 volts, at a negligible amperage which may be, for example 1 milliampere or less.

While this invention has been shown in the form in which the control is effected by use of throat microphones adapted to be pressed by the collar into engagement with the throat of the dog, other microphone mountings may be used in accordance with the invention. For example, the microphone may be mounted upon a fixed support (not shown) adjacent to a tethered dog, the collar and circuit arrangements being otherwise substantially as shown herein.

The invention is not limited to any particular device or apparatus herein shown for purposes of illustration, but embraces other forms thereof as claimed below.

What is claimed is:

1. A collar for use in the training of animals comprising an insulating support having secured thereto a throat microphone and a terminal, a metal-sheathed cable containing at least two insulated conductors secured to said support with one of said conductors electrically connected to said terminal and the other of said conductors electrically connected to said microphone, and a flexible metallic strand secured to and insulated from said cable adapted to be detachably secured to said support and thereby to be electrically connected to said terminal.

2. A training device for animals comprising, a flexible member adapted to be passed about and be secured to the body of an animal, said member including a pair of metallic portions insulated from each other and serving as electrodes in contact with the animal's body when the member is secured thereto, means electrically connecting said electrodes including a source of electricity and a normally open switch, means operatively associated with said switch for closing the same, a microphone operatively associated with said flexible member, circuit means operatively associating said microphone and the last mentioned means with said source whereby when the animal emits sound the microphone will conduct sufficient electricity therethrough to operate said means to close the switch and inflict a punitive charge to the animal.

3. In the training device as defined in claim 2 wherein said flexible member constitutes a collar, said microphone being adapted to be mounted on said collar and being pressed into engagement with the throat of the animal.

References Cited in the file of this patent

UNITED STATES PATENTS

| | | |
|---|---|---|
| 1,693,756 | Jordan | Dec. 4, 1928 |
| 2,023,950 | Carter | Dec. 10, 1935 |
| 2,368,207 | Eaton | Jan. 30, 1945 |
| 2,568,934 | Schenker | Sept. 25, 1951 |